(12) United States Patent
Arai et al.

(10) Patent No.: US 10,844,191 B2
(45) Date of Patent: Nov. 24, 2020

(54) POLYACETAL RESIN COMPOSITION

(71) Applicant: Polyplastics Co., Ltd., Tokyo (JP)

(72) Inventors: Hiroki Arai, Fuji (JP); Tomohiro Monma, Fuji (JP)

(73) Assignee: Polyplastics Co., Ltd., Tokyo (JP)

( * ) Notice: Subject to any disclaimer, the term of this patent is extended or adjusted under 35 U.S.C. 154(b) by 0 days.

(21) Appl. No.: 16/487,679

(22) PCT Filed: Feb. 23, 2018

(86) PCT No.: PCT/JP2018/006740
§ 371 (c)(1),
(2) Date: Nov. 21, 2019

(87) PCT Pub. No.: WO2018/180078
PCT Pub. Date: Oct. 4, 2018

(65) Prior Publication Data
US 2020/0172699 A1 Jun. 4, 2020

(30) Foreign Application Priority Data

Mar. 31, 2017 (JP) ................................ 2017-069783

(51) Int. Cl.
*C08K 3/22* (2006.01)
*C08G 2/10* (2006.01)
*C08K 5/134* (2006.01)

(52) U.S. Cl.
CPC ................. *C08K 3/22* (2013.01); *C08G 2/10* (2013.01); *C08K 5/1345* (2013.01); *C08K 2003/222* (2013.01); *C08K 2003/2224* (2013.01); *C08K 2003/2296* (2013.01); *C08K 2201/006* (2013.01); *C08K 2201/014* (2013.01)

(58) Field of Classification Search
None
See application file for complete search history.

(56) References Cited

U.S. PATENT DOCUMENTS

| | | | |
|---|---|---|---|
| 7,247,665 B1 | 7/2007 | Woerner et al. | |
| 2005/0020770 A1* | 1/2005 | Kim | C08K 5/0008 524/877 |
| 2005/0280156 A1* | 12/2005 | Lee | H01L 21/2007 257/758 |
| 2007/0073007 A1 | 3/2007 | Harashina | |
| 2009/0143508 A1 | 6/2009 | Bessho et al. | |
| 2015/0259520 A1* | 9/2015 | Kobayashi | C08L 11/00 524/151 |
| 2016/0251509 A1 | 9/2016 | Shimoda et al. | |
| 2017/0204247 A1 | 7/2017 | Shimoda et al. | |
| 2017/0327682 A1 | 11/2017 | Okui et al. | |

FOREIGN PATENT DOCUMENTS

| | | |
|---|---|---|
| JP | H07-286023 A | 10/1995 |
| JP | 2001-072830 A | 3/2001 |
| JP | 2003-509521 A | 3/2003 |
| JP | 2004-204193 A | 7/2004 |
| JP | 2008-001850 A | 1/2008 |
| JP | 2008-126523 A | 6/2008 |
| JP | 2009-132768 A | 6/2009 |
| JP | 2012-233121 A | 11/2012 |
| JP | 2015-034221 A | 2/2015 |
| JP | 2015-110714 A | 6/2015 |
| JP | 5814419 B | 11/2015 |
| JP | 2016-011398 A | 1/2016 |
| KR | 10-2006-0130034 A | 12/2006 |
| WO | WO 1995/023171 A1 | 8/1995 |
| WO | WO 2016/104255 A1 | 9/2017 |

OTHER PUBLICATIONS

Office Action issued in Korean Patent Application No. KR10-2019-7019473, dated Oct. 30, 2019.
Notice of Reasons for Rejection issued in Japanese Patent Application No. 2017-069783, dated Jul. 10, 2018.

* cited by examiner

*Primary Examiner* — Robert T Butcher
(74) *Attorney, Agent, or Firm* — Knobbe Martens Olson & Bear LLP

(57) ABSTRACT

The present invention addresses the problem of providing a polyacetal resin composition which can minimize degradation of a molded product produced from the acetal resin composition, when the molded product is in contact with an acidic cleaner. Said problem is solved by a polyacetal resin composition, comprising: polyacetal copolymer (A) in an amount of 100 parts by mass, wherein said polyacetal copolymer (A) has a hemiformal terminal group content of 0.8 mmol/kg or less; hindered phenol-based antioxidant (B) in an amount of 0.1 to 1.0 part by mass; and at least one selected from an oxide of magnesium or zinc or a hydroxide of magnesium or zinc (C) in an amount more than 2.0 parts by mass and 30 parts by mass or less.

5 Claims, No Drawings

POLYACETAL RESIN COMPOSITION

RELATED APPLICATIONS

This application is the U.S. National Phase under 35 U.S.C. § 371 of International Application PCT/JP2018/006740, filed Feb. 23, 2018, designating the U.S., and published in Japanese as WO 2018/180078 on Oct. 4, 2018, which claims priority to Japanese Patent Application No. 2017-069783, filed Mar. 31, 2018, the entire contents of which are incorporated herein by reference.

TECHNICAL FIELD

The present invention relates to a polyacetal resin composition having high resistance against acidic components.

BACKGROUND ART

Since polyacetal resins have excellent chemical resistance, molded products formed of a polyacetal resin as a raw material have been widely used for automobile components. For example, they have been used for large components such as fuel delivery units, representative examples of which are fuel contact bodies, such as fuel pump modules, which are directly in contact with fuel oil.

In recent years, sulfur reduction of fuels has progressed in order to respond to environmental regulations in various countries. However, since desulfurization equipment is highly costly, high sulfur-containing fuels are still being distributed in some countries. These high sulfur-containing fuels have a tendency to readily degrade polyacetal resins compared to low sulfur-containing fuels.

In response to these problems, the Applicant of the present application reported that formulating an oxide of alkali earth metal, polyalkylene glycol and a specific ester into a polyacetal resin results in significant improvement (Patent Document 1). In particular, a significant improving means was obtained for components of fuel delivery units or the like, which were in contact with high sulfur-containing fuels.
Patent Document 1: Japanese Patent No. 5814419

DISCLOSURE OF THE INVENTION

Problems to be Solved by the Invention

Although automobile components such as fuel delivery units are covered with a casing such as a hood, splashes of cleaner may sometimes adhere during car washing. In particular, when removing brake dust or the like attached to a wheel, strongly acidic cleaners, which are more acidic than high sulfur-containing fuels, may be used. Such cleaners are capable of degrading automobile components formed of polyacetal resins and this is also a serious problem.

An object of the present invention is to provide a polyacetal resin composition which can suppress a molded product formed thereof from being degraded when the product is in contact with an acidic cleaner.

Means for Solving the Problems

The present inventors have made diligent research to solve the above-mentioned problem, and have found that setting the composition of a polyacetal resin composition to a specified one achieves minimization of degradation of a molded product produced from the acetal resin composition, when the molded product is in contact with an acidic cleaner. Conventionally, formulating an excessive amount of alkaline earth metal oxide in a polyacetal resin promotes decomposition of unstable terminals in the polyacetal resin, and this results in unfavorable effects on the mechanical properties, moldability or the like (Patent Literature 1). The present inventors have found that upon reducing the content of a specific terminal group in a polyacetal resin to a given value or less and adjusting the polyacetal resin composition so as to contain a specific metal compound, the above-mentioned unfavorable effects can be reduced to a substantially non-problematic extent and acid resistance can be remarkably improved, and the present inventors have completed the present invention.

Namely, the present invention relates to the following. In a first aspect of the present invention, provided is a polyacetal resin composition, including: polyacetal copolymer (A) in an amount of 100 parts by mass, in which polyacetal copolymer (A) has a hemiformal terminal group content of 0.8 mmol/kg or less, hindered phenol-based antioxidant (B) in an amount of 0.1 to 1.0 part by mass, and at least one selected from an oxide of magnesium or zinc or a hydroxide of magnesium or zinc (C) in an amount more than 2.0 parts by mass and 30 parts by mass or less.

In a second aspect of the present invention, provided is the polyacetal resin composition according to the first aspect, in which at least one selected from the oxide of magnesium or zinc or the hydroxide of magnesium or zinc is magnesium oxide. In a third aspect of the present invention, provided is the polyacetal resin composition according to the first or second aspect, in which a BET specific surface area of the magnesium oxide is 100 $m^2/g$ or more.

In a fourth aspect of the present invention, provided is the polyacetal resin composition according to any one of the first to third aspects, including 0.5 to 3.0 parts by mass of polyalkylene glycol (D). In a fifth aspect of the present invention, provided is an automotive part including a molded product of the polyacetal resin composition according to any one of the first to fourth aspects. In a sixth aspect of the present invention, provided is the automotive part according to the fifth aspect, in which the automotive part is an automotive part brought into contact with an acidic cleaner. In a seventh aspect of the present invention, provided is a method for improving acid resistance against an acid component by using the molded product of the polyacetal resin composition according to any one of the first to fourth aspects. In an eighth aspect of the present invention, provided is the method according to the seventh aspect, in which the acid component is derived from an acidic cleaner.

Effects of the Invention

According to the present invention, it is possible to provide a polyacetal resin composition which can minimize degradation of a molded product produced of the polyacetal resin composition when the molded product is in contact with an acidic cleaner. Incidentally, the term "acidic cleaner" refers to a cleaner having a pH of 6 or less, optionally 2 or less, and examples thereof include a wheel cleaner.

PREFERRED MODE FOR CARRYING OUT THE INVENTION

Below, specific embodiments of the present invention are explained in detail, but the present invention is not in any way limited to the below embodiments, and within the scope of the objective of the present invention, suitable modifications may be implemented.

<Polyacetal Resin Composition>

The polyacetal resin composition of the present invention is characterized by comprising: polyacetal copolymer (A) in an amount of 100 parts by mass, wherein polyacetal copolymer (A) has a hemiformal terminal group content of 0.8 mmol/kg or less, hindered phenol-based antioxidant (B) in an amount of 0.1 to 1.0 part by mass, and at least one selected from an oxide of magnesium or zinc or a hydroxide of magnesium or zinc (C) in an amount more than 2.0 parts by mass and 30 parts by mass or less.

<<Polyacetal Copolymer (A)>>

In the present invention, polyacetal copolymer (A) having a specific terminal characteristic is used as a base resin. The polyacetal copolymer is a resin having an oxymethylene group ($-OCH_2-$) as a main structural unit as well as another comonomer unit other than the oxymethylene group and is typically manufactured by copolymerizing formaldehyde or a cyclic oligomer of formaldehyde as a main monomer with a compound selected from a cyclic ether or cyclic formal as a comonomer. Generally, unstable parts at the terminal are removed by hydrolysis to promote stability against thermolysis or acid/alkali decomposition.

In particular, as the main monomer, trioxane, a cyclic trimer of formaldehyde, is commonly used. Trioxane is generally obtained by reacting an aqueous formaldehyde solution in the presence of an acidic catalyst. This is purified by a method such as distillation and is used. Trioxane used for polymerization preferably contains as little as possible impurities, such as water, methanol, formic acid and the like, as is described below.

Examples of the cyclic ethers and cyclic formals as the comonomer include ethylene oxide, propylene oxide, butylene oxide, cyclohexene oxide, oxetane, tetrahydrofuran, trioxepane, 1,3-dioxane, 1,3-dioxolane, propylene glycol formal, diethylene glycol formal, triethylene glycol formal, 1,4-butanediol formal and 1,6-hexanediol formal.

In addition, compounds capable of forming branched or cross-linked structures may be used as the comonomer (or a termonomer). Examples of such compounds include alkyl or aryl glycidyl ethers such as methyl glycidyl ether, ethyl glycidyl ether, butyl glycidyl ether, 2-ethyl-hexyl glycidyl ether and phenyl glycidyl ether; and diglycidyl ethers of alkylene glycols or polyalkylene glycols, such as ethylene glycol diglycidyl ether, triethylene glycol diglycidyl ether and butanediol diglycidyl ether. These comonomers may be used alone or in combination of two or more.

The polyacetal copolymer as described above may be generally obtained by adding an appropriate amount of a molecular weight regulator and performing cationic polymerization using a cationic polymerization catalyst. Usable molecular weight regulators, cationic polymerization catalysts, polymerization methods, polymerization apparatuses, deactivation processes of catalysts after polymerization, terminal stabilization treatments of crude polyacetal copolymers obtained by polymerization, or the like, are known from many documents, and basically any of them may be used.

The molecular weight of the polyacetal copolymer to be used in the present invention is not particularly limited, and it is preferable that the weight average molecular weight is about 10,000 to 400,000. It is preferable that the melt index (measured at 190° C. under a load of 2.16 kg according to ASTM-D1238) serving as an index of fluidity of the resin is 0.1 to 100 g/10 min., and more preferably 0.5 to 80 g/10 min.

The polyacetal copolymer (A) to be used in the present invention needs to have a specific terminal characteristic as described above. Specifically, it is essential that the hemiformal terminal group content is 0.8 mmol/kg or less.

Here, the hemiformal terminal group is represented by $-OCH_2OH-$ and the content of such hemiformal terminal group may be determined by 1H-NMR measurement. As to the concrete measurement method, reference may be made to a method disclosed in Japanese Unexamined Patent Application, Publication No. 2001-11143.

When polyacetal copolymer (A) to be used does not have the above-mentioned terminal characteristic and the terminal characteristic exceeds the upper limit value, it is not possible to obtain a polyacetal resin composition which can satisfactorily reduce the generation amount of formaldehyde. Further, it becomes difficult to maintain the generation amount of formaldehyde due to repeated thermal history at a low level.

In this case, generation of mold deposits during molding becomes excessively large, and this results in a problem in molding. In addition, generation of formaldehyde promotes occurrence of voids in the molded product and may cause a problem in mechanical properties.

From such a viewpoint of maintaining moldability while maintaining acid resistance, polyacetal copolymer (A) to be used in the present invention preferably has a hemiformal terminal group content of 0.6 mmol/kg or less, more preferably 0.4 mmol/kg or less. The lower limit of the hemiformal terminal group content is not particularly limited.

As described above, polyacetal polymer (A) having a specific terminal characteristic may be produced by, for instance, reducing impurities contained in the monomer and the comonomer, selecting the production process or optimizing the production conditions thereof.

Specific examples of the method for producing polyacetal polymer (A) having the specific terminal characteristic satisfying the requirements of the present invention are given below, but the method is not limited to this method.

First, it is important to reduce amounts of active impurities forming unstable terminals in the polymerization system, specifically, impurities such as water, alcohols (e.g., methanol) or acids (e.g., formic acid) contained in the monomer and comonomer.

An excessively high content of this is, of course, not preferable for obtaining a polyacetal polymer having a small amount of unstable terminal portion. Note that a chain transfer agent which does not form an unstable terminal, for example, a low molecular weight linear acetal having alkoxy groups at both terminals, such as methylal, may be contained in an arbitrary amount to control the molecular weight of the polyacetal polymer.

Next, the amount of catalyst to be used in the polymerization reaction is also the most important factor. An excessive amount of catalyst makes it difficult to properly control polymerization temperatures, and the decomposition reaction during the polymerization becomes dominant, resulting in difficulty in obtaining a polyacetal polymer which satisfies the requirements of the present invention, namely a polyacetal polymer having a small content of unstable terminal portion. On the other hand, an overly small amount of catalyst may result in decrease in polymerization reaction rate or reduced polymerization yield, which is not preferable.

As the polymerization method, any method known in the art is possible, and a continuous mass polymerization method, in which liquid monomers are used and a polymer in the form of solid powder mass is obtained as polymerization progresses, is industrially preferable. A polymerization temperature is preferably maintained between 60 to 105° C., in particular, between 65 to 100° C.

When a catalyst comprising boron trifluoride or a coordination compound thereof is used, as the method of deactivating the catalyst after polymerization, a method of adding the polymer after polymerization to an aqueous solution containing a basic compound or the like may be used. In order to obtain the polyacetal polymer satisfying the requirements of the present invention, it is, however, preferable to pulverize and shatter the polymer obtained by the polymerization reaction, so that the polymer is brought into contact with a deactivating agent and the catalyst is quickly deactivated.

For example, it is desirable that the polymer to be subjected to deactivation of catalyst is pulverized and shattered, so that 80% by mass or more, preferably 90% by mass, thereof has a particle diameter of 1.5 mm or less, and 15% by mass or more, preferably 20% by mass or more, thereof has a particle diameter of 0.3 mm or less.

As the basic compound for neutralizing and deactivating the polymerization catalyst, ammonia; amines such as triethylamine, tributylamine, triethanolamine and tributanolamine; oxides, hydroxides and salts of alkali metals or alkaline earth metals; and other known catalyst-deactivating agents may be used. These basic compounds are preferably added as an aqueous solution of 0.001 to 0.5% by mass, particularly 0.02 to 0.3% by mass.

The temperature of the aqueous solution is preferably 10 to 80° C., particularly preferably 15 to 60° C. After polymerization is completed, it is preferable to quickly introduce the polymer into an aqueous solution of these to deactivate the catalyst.

The polyacetal polymer having a small content of unstable terminal may be produced by reducing the impurities contained in the monomer and the comonomer, selecting the production process, optimizing the production conditions thereof, and the like, as described above, and it is possible to further reduce the hemiformal terminal content by subjecting the polymer to a stabilization step.

As the stabilization step, known methods may be exemplified, such as a method of heating the polyacetal polymer to a temperature equal to or higher than its melting point and treating it in a molten state to decompose and remove only the unstable portion, or a method of conducting a heat treatment at a temperature equal to or higher than 80° C. while maintaining a heterogeneous system in an insoluble liquid medium to decompose and remove only the unstable terminal portion.

<<Hindered Phenol-Based Antioxidant (B)>>

As hindered phenol-based antioxidant (B) to be used in the present invention, the following may be exemplified: 2,2'-methylenebis(4-methyl-6-t-butylphenol), hexamethyleneglycol-bis(3,5-di-t-butyl-4-hydroxyhydrocinnamate), tetrakis[methylene 3(3,5-di-t-butyl-4-hydroxyphenyl)propionate] methane, triethyleneglycol-bis-3-(3-t-butyl-4-hydroxy-5-methylphenyl)propionate, 1,3,5-trimethyl-2,4,6-tris (3,5-di-t-butyl-4-hydroxy-benzyl)benzene, n-octadecyl-3-(4'-hydroxy-3',5'-di-t-butylphenol) propionate, 4,4'-methylenebis (2,6-di-t-butylphenol), 4,4'-butylidene-bis (6-t-butyl-3-methyl-phenol), di-stearyl-3,5-di-t-butyl-4-hydroxybenzylphosphonate, 2-t-butyl-6-(3-t-butyl-5-methyl-2-hydroxybenzyl)-4-methylphenylacrylate, 3,9-bis[2-[3-(3-t-butyl-4-hydroxy-5-methylphenyl)propionyloxy]-1,1-dimethylethyl]-2,4,8,10-tetraoxaspiro[5,5]undecane.

In the present invention, at least one or two or more selected from these antioxidants may be used.

The content of hindered phenol-based antioxidant (B) in the present invention is 0.1 to 1.0 part by mass, more preferably 0.2 to 0.5 parts by mass, relative to 100 parts by mass of polyacetal resin (A). When the formulation amount of antioxidant (B) is small, not only an antioxidant characteristic, which is an original object, becomes insufficient, but also cleaner resistance, which is the object of the present invention, becomes poor. Excessive formulation amount of antioxidant (B) provides undesirable effects to mechanical properties or moldability of the resin composition.

<<At Least One Selected from an Oxide of Magnesium or Zinc or a Hydroxide of Magnesium or Zinc (C)>>

As the at least one selected from an oxide of magnesium or zinc or a hydroxide of magnesium or zinc (C) (hereinafter abbreviated as compound (C)) to be used in the present invention, magnesium oxide, zinc oxide, magnesium hydroxide and the like may be exemplified. Among these compounds, magnesium oxide is preferable because balance between improvement in the cleaner resistance and performance such as mechanical properties or moldability is the most excellent. With respect to magnesium oxide, magnesium oxide having a BET-specific surface area of 100 $m^2/g$ or more is more preferable.

The content of compound (C) in the present invention is preferably greater than 2.0 parts by mass and not greater than 30 parts by mass, more preferably greater than 2.0 parts by mass and not greater than 10 parts by mass, relative to 100 parts by mass of polyacetal resin (A).

A content greater than 2.0 parts by mass achieves particularly excellent performance in properties as an acid resistant cleaner. A content within 30 parts by mass enables stable production and a content within 10 parts by mass achieves particularly excellent balance in the mechanical properties. Conventionally, an increased content of compound (C) sometimes promotes decomposition of unstable terminal in polyacetal resins, but polyacetal copolymer (A) of the present invention can suppress such decomposition, so that characteristics of improvement in acid resistance achieved by increasing the content of compound (C) could be found.

<<Polyalkylene Glycol (D)>>

In the present invention, it is also preferable that polyalkylene glycol (D) is optionally contained. Although the type of this is not particularly limited, from the viewpoint of compatibility with the polyacetal resin, that containing polyethylene glycol or polypropylene glycol is preferable, and that containing polyethylene glycol is more preferable.

The number average molecular weight (Mn) of the polyalkylene glycol is not particularly limited, but from the viewpoint of dispersibility in the polyacetal resin, it is preferably 1,000 or more and 50,000 or less, and more preferably 5,000 or more and 30,000 or less. In this specification, the number average molecular weight is polystyrene equivalent molecular weight obtained by gel permeation chromatography (GPC) using tetrahydrofuran (THF) as a solvent.

The content of polyalkylene glycol (D) in the present invention is 0.5 to 3.0 parts by mass, more preferably 1.0 to 2.0 parts by mass, relative to 100 parts by mass of polyacetal resin (A). When sufficient stress relaxation can be obtained without formulating polyalkylene glycol (D), it is not necessary to formulate polyalkylene glycol (D), but the upper limit of the addition amount is selected in balance with the mechanical properties of the molded product. These may be used by mixing two or more.

<<Other Components>>

The polyacetal resin composition of the present invention may contain other components as necessary. As long as the object or effects of the present invention are not inhibited, one or more known stabilizers for polyacetal resin compositions may be added.

<<Automobile Parts Comprising Molded Products of Polyacetal Resin Composition>>

The molded product formed of the polyacetal resin composition of the present invention may be used for any automobile part that may by brought into contact with cleaner during washing of an automobile body, such as wheels of the automobile.

This molded product can be obtained in a conventional molding method, for example, injection molding, extrusion molding, compression molding, blow molding, vacuum molding, foam molding and rotation molding, by using the above-mentioned polyacetal resin composition. Even when the molded product of the present invention is brought into contact with a strongly acidic cleaner having, for example, pH 2 or less, degradation is suppressed and good surface appearance of the molded product can be maintained.

EXAMPLES

Below, the present invention is described in detail by the Examples, but the present invention is not limited thereto.

Components of each type in Table 1 are as follows. Units in the table are parts by weight.

Polyacetal Copolymer (A)

A-1: polyacetal copolymer [hemiformal terminal group content=0.4 mmol/kg, melt index=9 g/10 min.]
A-2: polyacetal copolymer [hemiformal terminal group content=0.7 mmol/kg, melt index=9 g/10 min.]
A-3: polyacetal copolymer [hemiformal terminal group content=1.0 mmol/kg, melt index=9 g/10 min.]
A-4: polyacetal copolymer [hemiformal terminal group content=2.0 mmol/kg, melt index=9 g/10 min.]

Polyacetal copolymers A-1 to A-4 were prepared as described below.

A-1: a mixture of 96.7% by mass of trioxane and 3.3% by mass of 1,3-dioxolane was continuously supplied to a continuous polymerization machine of twin-screw paddle type, and 10 ppm of boron trifluoride was added as a catalyst to carry out polymerization. The mixture of trioxane and 1,3-dioxolane to be subjected to polymerization contained 4 ppm of water, 2.5 ppm of methanol and 2 ppm of formic acid as impurities.

To the polymer discharged from the discharge port of the polymerization machine, an aqueous solution containing triethylamine in a content of 1,000 ppm was immediately added, and the polymer was pulverized and stirred to deactivate the catalyst, and then centrifuged and dried to obtain a crude polyoxymethylene copolymer.

Next, this crude polyoxymethylene copolymer was supplied to a twin screw extruder having a vent port, and a 0.3% triethylamine aqueous solution was added in a content of 0.4% to the crude polyoxymethylene copolymer, which was subjected to melt kneading at a resin temperature of about 220° C., so that the unstable terminal portion was degraded, and a volatile component containing the degradation product was vaporized off under reduced pressure from the vent port. The polymer withdrawn from the die of the extruder was cooled and shredded to obtain polyacetal copolymer A-1 in the form of pellets, in which the unstable terminal portion was removed.

A-2: a mixture of 96.7% by mass of trioxane and 3.3% by mass of 1,3-dioxolane was continuously supplied to a continuous polymerization machine of twin-screw paddle type, and 10 ppm of boron trifluoride was added as a catalyst to carry out polymerization. The mixture of trioxane and 1,3-dioxolane to be subjected to polymerization contained 10 ppm of water, 3.5 ppm of methanol and 5 ppm of formic acid as impurities.

To the polymer discharged from the discharge port of the polymerization machine, an aqueous solution containing triethylamine in a content of 1,000 ppm was immediately added, and the polymer was pulverized and stirred to deactivate the catalyst, and then centrifuged and dried to obtain a crude polyoxymethylene copolymer.

Next, this crude polyoxymethylene copolymer was supplied to a twin screw extruder having a vent port, a 0.3% triethylamine aqueous solution was added in a content of 0.4% to the crude polyoxymethylene copolymer, which was subjected to melt kneading at a resin temperature of about 220° C., so that the unstable terminal portion was degraded, and the volatile component containing a degradation product was vaporized off under reduced pressure from the vent port. The polymer withdrawn from the die of the extruder was cooled and shredded to obtain polyacetal copolymer A-2 in the form of pellets, in which the unstable terminal portion was removed.

A-3: a mixture of 96.7% by mass of trioxane and 3.3% by mass of 1,3-dioxolane was continuously supplied to a continuous polymerization machine of twin-screw paddle type, and 15 ppm of boron trifluoride was added as a catalyst to carry out polymerization. The mixture of trioxane and 1,3-dioxolane to be subjected to polymerization contained 10 ppm of water, 3.5 ppm of methanol and 5 ppm of formic acid as impurities.

To the polymer discharged from the discharge port of the polymerization machine, an aqueous solution containing triethylamine in a content of 1,000 ppm was immediately added, and the polymer was pulverized and stirred to deactivate the catalyst, and then centrifuged and dried to obtain a crude polyoxymethylene copolymer.

Next, this crude polyoxymethylene copolymer was supplied to a twin-screw extruder having a vent port, subjected to melt kneading at a resin temperature of about 220° C., so that the unstable terminal portion was degraded, and the volatile component containing a degradation product was vaporized off under reduced pressure from the vent port. The polymer withdrawn from the die of the extruder was cooled and shredded to obtain polyacetal copolymer A-3 in the form of pellets, in which the unstable terminal portion was removed.

A-4: a mixture of 96.7% by mass of trioxane and 3.3% by mass of 1,3-dioxolane was continuously supplied to a continuous polymerization machine of twin-screw paddle type, and 20 ppm of boron trifluoride was added as a catalyst to carry out polymerization. The mixture of trioxane and 1,3-dioxolane to be subjected to polymerization contained 20 ppm of water, 3.5 ppm of methanol and 5 ppm of formic acid as impurities.

To the polymer discharged from the discharge port of the polymerization machine, an aqueous solution containing triethylamine in a content of 1,000 ppm was immediately added, and the polymer was pulverized and stirred to deactivate the catalyst, and then centrifuged and dried to obtain a crude polyoxymethylene copolymer.

Next, this crude polyoxymethylene copolymer was supplied to a twin-screw extruder having a vent port, subjected to melt kneading at a resin temperature of about 220° C., so that the unstable terminal portion was degraded, and the volatile component containing a degradation product was vaporized off under reduced pressure from the vent port. The polymer withdrawn from the die of the extruder was cooled and shredded to obtain polyacetal copolymer A-4 in the form of pellets, in which the unstable terminal portion was removed.

Hindered Phenol-Based Antioxidant (B)

(B-1) Tetrakis[methylene-3-(3,5-di-t-butyl-4-hydroxyphenyl)propionate]methane (product name: Irganox 1010, manufactured by BASF)

Metal Compound (C)

(C-1) Magnesium oxide with a specific surface area of 30 $m^2/g$ (product name: Kyowa Mag MF30, manufactured by Kyowa Chemical Industry Co., Ltd.)

(C-2) Magnesium oxide with a specific surface area of 135 $m^2/g$ (product name: Kyowa Mag MF150, manufactured by Kyowa Chemical Industry Co., Ltd.)

(C-3) Magnesium hydroxide (product name: V-6, manufactured by Konoshima Chemical Co., Ltd.)

(C-4) Zinc oxide (product name: active zinc oxide AZO, manufactured by Seido Chemical Industry Co., Ltd.)

Polyalkylene Glycol (D)

(D-1) Product name: PEG 6000S (manufactured by Sanyo Chemical Industries, Ltd.)

Polyvalent fatty acid full ester (E): pentaerythritol stearate (product name: Unister H476, manufactured by NOF Corporation)

Examples and Comparative Examples

Ingredients shown in Table 1 were added and mixed at ratios shown in Table 1 and melt kneaded with a twin-screw extruder to prepare a pelletized composition.

<Evaluation>

(1) Moldability: Mold Deposit

Molding machine: FANUC ROBOSHOT S-2000i 50B (Fanuc Corporation)

Molding conditions: cylinder temperature (° C.), Nozzle-C1-C2-C3:

205, 215, 205, 185° C., respectively.

Injection pressure: 40 (MPa)

Injection velocity: 1.5 (m/min.)

Mold temperature: 60(° C.)

(2) Evaluation of Resistance Against Acidic Cleaners

ISO type 1-A tensile test specimens having a thickness of 4 mm were produced by injection molding, using the polyacetal resin compositions prepared in the Examples and the Comparative Examples.

[Method of Evaluation]

In order to evaluate resistance of the polyacetal resin compositions against acidic cleaners, both ends of each of the tensile test specimens were fixed and bent at a rate of 1.5% of load strain. Then, an acidic cleaner was sprayed on the surface of the tensile test specimen and the tensile test specimen after spraying was left under the condition of 60° C. for 20 hours. Thereafter, the tensile test specimen was left under the conditions of 23° C. and 55% RH for 4 hours.

The following acidic cleaners were used as the acidic cleaner.

Cleaner: sulfuric acid: 1.5%, hydrofluoric acid: 1.5%, phosphoric acid: 10%

Each time one cycle consisting of spraying the acidic cleaner, leaving the tensile test specimen at 60° C. for 20 hours, and leaving the tensile test specimen at 23° C. for 4 hours was completed, the state of crack generation on the surface of the dumbbell test specimen was visually observed, and the test specimens were classified into A+ to C by the following number of cycles.

C: less than 7
B: 7 or more and less than 10
A: 10 or more and less than 16
A+: 16 or more

TABLE 1

|  |  |  | Example | | | | | | | | | | | Comparative Example | | | | | |
|---|---|---|---|---|---|---|---|---|---|---|---|---|---|---|---|---|---|---|
|  |  |  | 1 | 2 | 3 | 4 | 5 | 6 | 7 | 8 | 9 | 10 | 1 | 2 | 3 | 4 | 5 | 6 |
| Composition | (A) | A-1 |  |  |  |  |  |  |  |  |  | 100 |  |  |  |  |  |  |
|  |  | A-2 | 100 | 100 | 100 | 100 | 100 | 100 | 100 | 100 | 100 |  |  |  |  |  |  |  |
|  |  | A-3 |  |  |  |  |  |  |  |  |  |  | 100 | 100 |  |  | 100 | 100 |
|  |  | A-4 |  |  |  |  |  |  |  |  |  |  |  |  | 100 |  |  |  |
|  | (B) | 3-1 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
|  | (C) | C-1 | 2.5 | 5 |  |  |  | 2.5 |  |  |  |  | 1.0 | 2.5 |  |  | 2.5 | 2 |
|  |  | C-2 |  |  | 2.5 | 5 | 25 |  | 2.5 |  | 5 |  |  |  |  | 2.5 |  |  |
|  |  | C-3 |  |  |  |  |  |  |  | 2.5 |  |  |  |  | 1.5 |  |  |  |
|  |  | C-4 |  |  |  |  |  |  |  |  |  | 5 |  |  |  |  |  |  |
|  | (D) | D-1 |  |  |  |  |  | 1 | 1 |  |  |  |  |  |  |  | 1 | 2 |
|  | (E) |  |  |  |  |  |  |  |  |  |  |  |  |  |  |  |  | 0.5 |
| Evaluation |  | Moldability | 0 | 0 | 0 | 0 | 0 | 0 | 0 | 0 | 0 | 0 | 0 | 1 | 0 | 2 | 1 | 0 |
|  |  | Acid resistance | B | A | A | A+ | A+ | A+ | A+ | B | B | A+ | C | B | C | A | A | C |

Using the polyacetal resin compositions prepared in the Examples and the Comparative Examples, mold deposit specimens (disk type) were molded under the following conditions.

[Method of Evaluation]

After 2,000 shots molding, the surface of the cavity member on the movable mold was visually observed, and the amount of attached matter was judged according to the following criteria.

0: no deposits were observed.
1: deposits were observed.
2: a large amount of deposits was observed.

As a result, in the test specimens made of the polyacetal resin compositions of Examples 1 to 11 and Comparative Examples 2 to 4, cracks did not occur in the test specimens, even when 7 cycles or more were completed.

In contrast, in the test specimens made of the polyacetal resin compositions of Comparative Examples 1, 3 and 6, cracks occurred in the test specimens before 6 cycles were completed. From the Examples and the Comparative Examples, it was confirmed that the product of the present invention was excellent in both moldability and resistance against acidic cleaners.

The invention claimed is:

1. A polyacetal resin composition, comprising:
a polyacetal copolymer (A) in an amount of 100 parts by mass, wherein the polyacetal copolymer (A) has a hemiformal terminal group content of 0.8 mmol/kg or less;
a hindered phenol-based antioxidant (B) in an amount of 0.1 to 1.0 part by mass; and
an oxide of magnesium (C) in an amount more than 2.0 parts by mass and 30 parts by mass or less, wherein a BET specific surface area of the magnesium oxide is 100 m$^2$/g or more.

2. The polyacetal resin composition according to claim 1, comprising 0.5 to 3.0 parts by mass of polyalkylene glycol (D).

3. An automotive part comprising a molded product of the polyacetal resin composition according to claim 1.

4. A method for preparing an automotive part having acid resistance against an acid component, comprising placing the polyacetal resin composition according to claim 1 into a mold and polymerizing the composition such that the composition takes the shape of the automotive part.

5. The method according to claim 4, wherein the acid component is derived from an acidic cleaner.

* * * * *